W. OSMOND.
Barbed Top for Fence.
No. 222,526. Patented Dec. 9, 1879.
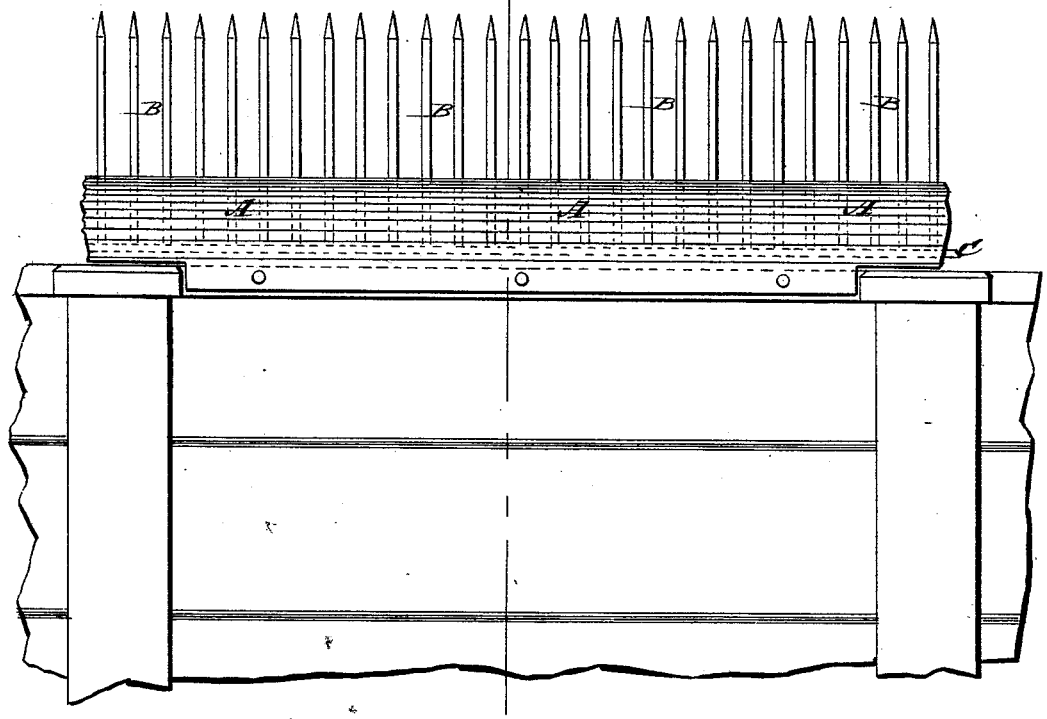
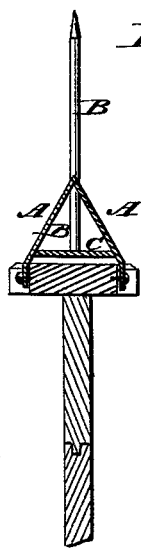
WITNESSES:
Francis McArdle.
C. Sedgwick.
INVENTOR:
W. Osmond
BY Munn & Co
ATTORNEYS.

UNITED STATES PATENT OFFICE.

WILLIAM OSMOND, OF NEW YORK, N. Y.

IMPROVEMENT IN BARBED TOPS FOR FENCES.

Specification forming part of Letters Patent No. 222,526, dated December 9, 1879; application filed June 19, 1879.

*To all whom it may concern:*

Be it known that I, WILLIAM OSMOND, of the city, county, and State of New York, have invented a new and useful Improvement in Barbed Tops for Fences, of which the following is a specification.

Figure 1 is a side view of a part of a fence to which my invention has been applied. Fig. 2 is a vertical cross-section of the same, taken through the line $x\ x$, Fig. 1.

Similar letters of reference indicate corresponding parts.

The object of this invention is to furnish an improved device for attachment to the tops of fences, especially in back yards, to prevent cats from crossing or walking upon them, and to thus prevent annoyance from the collection of cats by night in the said yards, and which shall be simple in construction and easily applied to the fences.

The invention consists in the device formed of the strip of sheet metal bent into V form, the rods, and the bar or plate to adapt the device to be attached to the top of a fence, as hereinafter fully described.

A represents a narrow sheet of zinc or other suitable sheet metal, which is bent into V form, and has a number of holes formed through it at its angle, to receive the rods B. The upper ends of the rods B are pointed, and their lower ends are attached to a bar or plate, C, which may be made of wood or metal, and to which the side parts of the sheet A are attached.

The bar or plate C may be attached to the top of the fence, or the edges of the strip A, of sheet metal, may project so as to be attached to the sides of the top of the fence.

The rods B may be straight, as shown in the drawings, or they may be bent to one side, or part to one side and part to the other side, as may be desired. The rods B should be placed so close together that a cat cannot pass between them, and should be so strong that a cat cannot bend them to one side and thus squeeze through between them.

With this construction the cats can get no foot-hold upon the top of the fence, and can neither cross it nor walk along it, so that it will be impossible for them to collect in back yards when the division-fences have this device attached to their tops.

Having thus described my invention, I claim as new and desire to secure by Letters Patent—

The device formed of the strip A, of sheet metal, bent into V form, the rods B, and the bar or plate C, to adapt the device to be attached to the top of a fence, substantially as herein shown and described.

WILLIAM OSMOND.

Witnesses:
JAMES T. GRAHAM,
C. SEDGWICK.